United States Patent [19]

Chipman et al.

[11] 4,008,206
[45] Feb. 15, 1977

[54] SOLID STATE POLYMERIZATION

[75] Inventors: Gary R. Chipman, Naperville; Ronald E. Bockrath, Aurora, both of Ill.

[73] Assignee: Standard Oil Company a corporation of Indiana, Chicago, Ill.

[22] Filed: Oct. 2, 1974

[21] Appl. No.: 511,166

[52] U.S. Cl. .......................... 260/75 M; 260/75 T
[51] Int. Cl.² ....................................... C08G 63/26
[58] Field of Search .................... 260/75 M, 75 T

[56] References Cited
UNITED STATES PATENTS

| | | | |
|---|---|---|---|
| 2,799,664 | 7/1957 | Drewitt et al. | 260/75 M |
| 3,516,957 | 6/1970 | Gray et al. | 260/75 T |
| 3,761,450 | 9/1973 | Herwig et al. | 260/75 T |
| 3,816,377 | 6/1974 | Okuzumi | 260/75 M |
| 3,840,632 | 10/1974 | Maxion et al. | 260/75 M X |

*Primary Examiner*—Murray Tillman
*Assistant Examiner*—W. C. Danison, Jr.
*Attorney, Agent, or Firm*—William H. Magidson; Arthur G. Gilkes; William T. McClain

[57] ABSTRACT

Solid state polymerization of relatively low I.V. polyester using an organic crystalline anti-stick agent having a melting point of at least 230° C.

7 Claims, No Drawings

SOLID STATE POLYMERIZATION

This invention relates to solid-state polycondensation of polyesters bearing an organic crystalline anti-stick agent having a melting point over 230° C. More particularly this invention relates to solid-state condensation of linear polyesters with organic dicarboxylic acids having a melting point over 260° C.

Polyesters, particular polyethylene terephthalate and polybutylene terephthalate having a high I.V. (inherent viscosity) are commonly produced from low I.V. polyesters of the same composition by solid-state polymerization. U.S. Pat. No. 3,728,309 of Maxion points out that the solid phase polycondensation of polyesters has been held back mainly by the tendency of the polymer particles to agglomerate during solid-state polymerization. This patent discusses many of the techniques that have been employed to minimize agglomeration. In addition to the methods described in U.S. Pat. No. 3,728,309, various references have suggested that the polyester can be mixed with an inorganic powder, such as talc, which functions as an anti-stick agent during the solid-state polymerization. While this latter technique overcomes many of the problems inherent in other solid-state polymerizations, the technique has the disadvantage that molded objects produced from the high I.V. solid-state polymers tend to be opaque or translucent due to the inorganic material. Accordingly, there is a need for a new method of solid-state polymerization wherein the advantages of an anit-stick agent can be obtained without loss of clarity in the molded polyester resin.

The general objective of this invention is to provide a method of producing high I.V. polyester resins by solid-state polymerization without agglomeration. A more specific objectve of this invention is to produce substantially clear high I.V. polyesters by solid-state polymerization without agglomeration. Other objectives appear hereinafter.

For the purpose of this invention all I.V.s were determined in 60:40 phenol:tetrachloroethane at 30° C. and 0.4g/dl concentration.

Briefly, this invention comprises polymerizing under solid state polymerization conditions a polyester having a relatively low I.V. and an organic crystalline anti-stick agent having a melting point over 230° C. The anti-stick agent must either be soluble in a melt of the polyester, such as that formed during extrusion of polyester chip, or reactive with the polyester end groups. If one of these criteria is not satisfied, the anti-stick agents have the same drawback as the inorganic anti-stick agents. Preferably the anti-stick agents are soluble in a melt of the polyester and have at least two functional groups which are potentially reactive with the polyester hydroxyl or carboxyl groups. Under these conditions a substantial clear molded object can be produced from the high I.V. polyester. Further, the multi-functionality of the anti-stick agents is advantageous in chain extending the polyester thereby reducing the solid state polymerization time. If the anti-stick agent has only one group, which is potentially reactive with the polyester hydroxyl or carboxyl groups, the anti-stick agent has the disadvantage of acting as a polymer chain terminator thereby increasing the time necessary for solid state polymerization. If the anti-stick agent contains no potentially reactive functional groups the anti-stick agent functions solely as a plasticizer in the final molded object. Accordingly, the selection of anti-stick agent can be based upon these various parameters.

The anti-stick agents must have a melting point over 230° C., preferably over 260° C. The lower the melting point of the anti-stick agent the lower the temperature at which the solid state polymerization must be initiated to obtain the advantageous properties of the anti-stick agent. In some cases, the initial solid state polymerization can be carried out at below the melting point of the anti-stick agent and after the molecular weight of the polyester has been raised sufficiently, the solid state polymerization can be continued at a temperature over the melting point of the anti-stick agent.

The anti-stick agents of this invention can be used in a concentration of 0.05 to 10 parts by weight per 100 by weight polyester. Suitable anti-stick agents include aromatic dicarboxylic acids such as terephthalic acid, naphthalene 2,6-dicarboxylic acid, isophthalic acid, 2,5-dibromoterephthalic acid, etc. Of these, terephthalic acid and 2,6-naphthalene dicarboxylic acid are preferred since these acids meet all the requirements set forth above for the preferred anti-stick agents and seem to be very reactive under solid-state polymerization conditions with the lower I.V. polyesters.

Virtually any polyester susceptible to solid state polymerization can be used in this invention in addition to polyethlene terephthalate and polybutene terephthalate referred to above. For example, this technique can be employed for the polymerization of polyethylene-trimellitate imides having an I.V. of at least 0.3 of the type described in commonly assigned Ser. No. 432,569 of Golinkin et al., polybutylene 2.5-dibromoterephthalate, etc. However, the preferred polyesters have at least about 75 mol percent of their acid moieties provided by terephthalic acid and/or a naphthalene dicarboxylic acid (preferably 2,6-) while the diol moieties are provided by glycols such as ethylene glycol, butylene glycol, 1,4-dimethylol cyclohexane, etc., or aromatic diols, such as hydroquinone, Bisphenol A, etc. The polyester can also contain residues of other dicarboxylic acids such as adipic acid, isophthalic acid, sebacic acid, etc. In general, the preferred polyesters have an initial starting I.V. of at least 0.3 dl/g in a 60:40 phenol:tetrachloroethane at 30° C. and 0.4g/dl concentration, preferably 0.45 to about 0.7. Other things being equal, the lower the I.V. of the starting polyester the lower the melting point and the smaller the average particle size.

The starting polyesters to be utilized in this invention are typically prepared by melt polymerization techniques, and molten resin is generally converted from the amorphous to the crystalline state prior to solid-state polymerization in order to raise the sticking temperature of the starting polyester. Preferably the polyester is at least 20% crystalline. This crystallization can be accomplished by any suitable treatment such as slowly cooling an extruded or cast polymer melt to room temperature, or a quenched polymer melt in the amorphous state may be crystallized by a controlled heating treatment or by treating the solid polymer with organic solvent vapors or with steam as referred to in U.S. Pat. No. 3,728,309.

In the case of polyethylene terephthalate pre-polymers, the sticking temperature of crystalline or partially crystalline polyethylene terephthalate is about 230° C. in contrast with the usual range of about 100° to 150° C. for the amorphous state. Typically the polyester can be converted to about 20 to 40% crystallinity by heating at 150° C. for 5 to 300 minutes. At lower crystallization temperatures, longer heating times are generally desirable. Suitable time relationships can be determined easily by observing the change in appearance of the particular polyester as it changes from translucent to opaque as an indication of substantial crystal formation in the polyester. Although the low I.V. polyester may be in the form of thin film filaments or ribbons, it is usually preferable to sub-divide the material as by flaking or chopping a film or sheet into thin pieces or by chopping or cutting films, ribbons or rods. The chopped material can be ground or pulverized to provide a fine powder for solid-state reaction. The particles may range from about 0.01 inch to 0.3 inch in diameter. However, the smaller the average diameter of the particles the faster the solid-state polymerization.

The polyester, whether crystallized, partially crystallized, or amorphous can be coated with about 0.05 to 10 parts by weight of an organic crystalline anti-stick agent per each 100 parts by weight polyester in a ribbon type of blender etc. After a homogeneous particulate composition is formed, the pellets or flakes of the resin can be polymerized under solid state conditions in a fluidized bed of fine particles and continually maintained in motion by a flow of inert carrier gas such as nitrogen or the resin may be passed through a polymerization tower by gravity flow. Regardless of the system utilized a vacuum system or other provision should be made for removing the glycols liberated in the solid-state polymerization stage. Suitable solid-state polymerization temperatures can range from a temperature just above the threshold temperature of the polymerization reaction up to a temperature within a few degrees of the sticking temperature of the resin or its melting point. The reaction temperatures differ somewhat for polymers or co-polymers of different compositions and of different molecular weight or depending upon the melting points of the partially crystallized polymer or anti-stick agent employed. In the case of polyethylene terephthalate, the overall solid state temperature range may extend from about 200° to 270° C.

Although it is preferred to employ a polyester having some crystallinity in the solid state polymerization process, amorphous polymers can be used advantageously where adequate agitation is provided. However, where there is no agitation or insufficient agitation such as in a static tower reactor, the polyesters must be at least 20% crystalline.

The following examples are merely illustrative.

EXAMPLE I

A 0.6 I.V. homopolymeric polyethylene terephthalate, having an average diameter of 0.06 inch to 0.09 inch was coated with 0.5 weight percent terephthalic acid by tumbling the composition in a jar for one hour. The coated polyester was crystallized 40% by heating at 150° C. for 1.5 hours and placed in a cylindrical vessel. A nitrogen stream was passed up through the coated polyethylene terephthalate particles, at a rate of 570 centimeters per minute while maintaining the reactants at 240° C. for 16 hours. The particulate polyester was still free-flowing when it was removed from the cooled reactor and had an I.V. of 1.04 dl/g whereas a control run without the terephthalic acid anti-stick agent was much more agglomerated and difficult to remove from the reactor. The 1.04 dl/g polyester produced by the method of this invention was molded into a clear bar having an I.V. of 0.91 dl/g. When this example was repeated using an inorganic anti-stick agent molded bars were hazy and optically unclear.

EXAMPLE 2

Example 1 was repeated with essentially the same results except that terephthalic acid was replaced with 2,6-naphthalene dicarboxylic acid. After 16 hours the polymer had an I.V. of 1.18 dl/g.

EXAMPLE 3

Example 1 was repeated with essentially the same results except that terephthalic acid was replaced with trimesic acid and the polyester particles did not flow quite as well as the polyester particles of Example 1.

We claim:

1. The method of producing a relatively high inherent viscosity polyester resin without agglomeration which comprises polymerizing a polyester having an initial starting inherent viscosity of about 0.3 – 0.7 dl/g under solid state polymerization conditions together with an organic crystalline polycarboxylic acid anti-stick agent having a melting point of at least 230° C wherein said anti-stick agent is present in a concentration of 0.05 – 10 parts by weight per each 100 parts by weight polyester and the inherent viscosity is determined in a 60:40 phenol: tetrachloroethane at 30° and 0.4 g/dl.

2. The process of claim 1, wherein at least 75 mol percent of the acid moieties in the polyester are provided by terephthalic acid and/or naphthalene 2,6-dicarboxylic acid.

3. The process of claim 1 wherein said polyester is at least 20% crystalline.

4. The process of claim 1, wherein said anti-stick agent comprises terephthalic acid.

5. The process of claim 1, wherein said anti-stick agent comprises 2,6-naphthalene dicarboxylic acid.

6. The process of claim 1, wherein said anti-stick agent is soluble in a melt of the polyester.

7. The process of claim 1 wherein the relatively low I.V. polyester is in a particulate form and has a diameter of from about 0.01 inch to 0.3 inch.

* * * * *